(12) United States Patent
Yamada et al.

(10) Patent No.: US 6,957,594 B2
(45) Date of Patent: Oct. 25, 2005

(54) STARTER HAVING HELICAL VENTILATION GROOVE IN TUBE

(75) Inventors: Toyohisa Yamada, Kariya (JP); Shinji Usami, Okazaki (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 10/237,718

(22) Filed: Sep. 10, 2002

(65) Prior Publication Data

US 2003/0056610 A1    Mar. 27, 2003

(30) Foreign Application Priority Data

Sep. 27, 2001  (JP) .............................. 2001-295538

(51) Int. Cl.$^7$ ............................................. F02N 15/04
(52) U.S. Cl. ...................... 74/8; 74/6; 74/7 R; 384/294
(58) Field of Search ............................. 74/6, 7 R, 7 A, 74/7 B, 7 C, 7 D, 7 E, 8, 9; 384/283, 292, 384/294, 321

(56) References Cited

U.S. PATENT DOCUMENTS

| | | | | |
|---|---|---|---|---|
| 4,655,615 A | * | 4/1987 | Mori ........................... | 384/286 |
| 4,693,617 A | * | 9/1987 | Roemer et al. ............. | 384/282 |
| 5,179,864 A | * | 1/1993 | Ueta et al. ................... | 74/7 A |
| 5,331,860 A | * | 7/1994 | Demoule et al. ............. | 74/7 R |
| 5,370,009 A | * | 12/1994 | Isozumi ........................ | 74/7 C |
| 5,752,429 A | * | 5/1998 | Felton et al. ................... | 92/86 |
| 5,806,366 A | * | 9/1998 | Vilou ........................... | 74/7 R |

FOREIGN PATENT DOCUMENTS

FR    2 739 661 A1    4/1997
JP    U 1-166275    11/1989

OTHER PUBLICATIONS

U.S. Appl. No. 09/977,234, filed Oct. 16, 2001, Yamada et al.

* cited by examiner

*Primary Examiner*—David A. Bucci
*Assistant Examiner*—Bradley J. Van Pelt
(74) *Attorney, Agent, or Firm*—Oliff & Berridge, PLC

(57) ABSTRACT

In a starter, a cylindrical tube is slidablly engaged with an outer peripheral surface of an output shaft through a bearing in an axial direction. A front end of the tube, which supports a pinion, is closed to define an enclosed space between the front end of the tube and an end of the output shaft. A ventilation groove is formed on an inner cylindrical surface of the tube to communicate the enclosed space with a space defined rearward of the bearing. The ventilation groove has a helical shape twisted about an axis of the tube. When the bearing is press-fitted in the tube, a direction of press-fitting the tube and a direction along the ventilation groove do not coincide, but cross each other.

7 Claims, 3 Drawing Sheets

US 6,957,594 B2

STARTER HAVING HELICAL VENTILATION GROOVE IN TUBE

CROSS REFERENCE TO RELATED APPLICATION

This application is based on Japanese Patent Application No. 2001-295538 filed on Sep. 27, 2001, the disclosure of which is incorporated herein by reference.

FIELD OF THE INVENTION

The present invention relates to a starter for starting an engine. Particularly, the present invention relates to an outboard-type starter, which has a pinion at a front end of a tube sliding on an output shaft.

BACKGROUND OF THE INVENTION

In a starter disclosed in JP-U-1-166275, a cylindrical tube is slidablly engaged with an outer peripheral surface of an output shaft through a bearing. An end of the tube is closed with a plate. A straight ventilation groove is formed on the inner cylindrical surface of the tube in an axial direction to communicate an enclosed space defined around an end of the output shaft in the closed end of the tube and a space defined rearward of the bearing (a space in a one-way clutch).

Since the ventilation groove is formed into a straight line in the axial direction, when the bearing is press-fitted in the tube, the bearing is likely to be partially deformed and projected into the ventilation groove. Specially, in a case that an inexpensive wrapping bearing that is formed by rounding a rectangular-shaped plate into a cylindrical shape is used as the bearing, if a joint portion of the cylinder is moved along the ventilation groove while the bearing is press-fitted in the tube, the bearing is deformed and largely protruded into the ventilation groove.

In this state, even when the inner surface of the bearing is drawn to improve a precision of an inner diameter of the bearing, it is difficult to properly draw the portion of the bearing that is deformed or projected in a radial direction of the bearing. Therefore, a performance of the bearing is likely to be lessened. Further, it is likely to cause a starter performance deterioration.

Further, when the bearing press-fitted in the tube is partially protruded into the ventilation groove, a space of the ventilation groove is decreased. As a result, a flow of air in the ventilation groove is likely to be worsened.

SUMMARY OF THE INVENTION

The present invention is made in view of the above disadvantages, and it is an object of the present invention to provide a starter in which a performance of a bearing press-fitted in a tube is maintained and a function of a ventilation groove is improved.

In a starter of the present invention, a cylindrical tube is engaged with an outer peripheral surface of an output shaft through a bearing to be slidable in an axial direction. The output shaft is rotated with an operation of a motor. The rotation of the output shaft is transmitted to the tube through a one-way clutch. The tube has a first end supporting a pinion and a second end. The first end is closed to define an enclosed space between the first end of the tube and the end of the output shaft. The tube has a ventilation groove on an inner cylindrical surface so that the enclosed space communicates with a space defined in the proximity of the second end of the tube. The ventilation groove has a helical shape twisted about an axis of the tube.

According to this, when the bearing is press-fitted in the tube, a direction of press-fitting the bearing crosses a direction along the ventilation groove. Therefore, it is decreased that an identical portion of the bearing is moved along the ventilation groove when the bearing is press-fitted in the tube. As a result, a deformation (projection in a radial direction) of the bearing is suppressed. Thus, a space of the ventilation groove is maintained.

Further, it is decreased that the bearing is deformed or projected into the ventilation groove at circumferentially same positions through an axial direction of the bearing. As a result, it becomes easy to draw the inner periphery of the bearing properly. Thus, a precision of an inner diameter of the bearing is improved.

BRIEF DESCRIPTION OF THE DRAWINGS

Other objects, features and advantages of embodiments will become more apparent from the following detailed description made with reference to the accompanying drawings, in which.

DETAILED DESCRIPTION OF PREFERRED EMBODIMENT

Preferred embodiments of the present invention will be described hereinafter with reference to the drawings.

Figure 1:
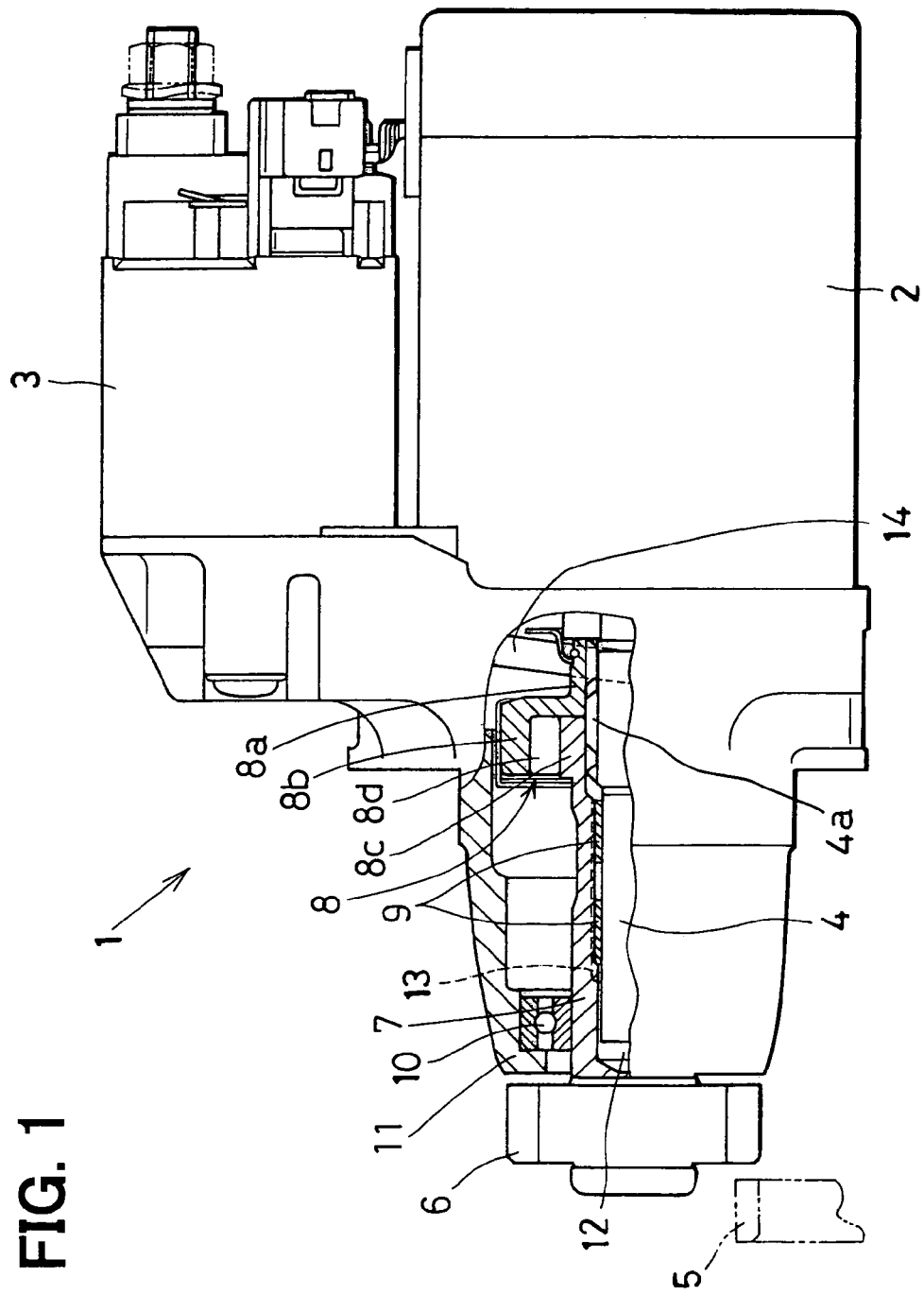
FIG. 1 is a schematic illustration of a starter, partially in cross-section, according to an embodiment of the present invention.

Referring to FIG. 1, the starter 1 of the present invention has a motor 2 for generating a rotation force, a magnet switch 3 for turning on/off the motor 2, an output shaft 4 for outputting the rotation force of the motor 2, a pinion 6 for transmitting the rotation force of the motor 2 to a ring gear 5 of an engine, a tube 7 supporting the pinion 6, a one-way clutch 8 for transmitting rotation of the output shaft 4 to the tube 7 and the like.

The motor 2 is a well-known d.c. motor. When an ignition key switch is turned on, an inner contact (not shown) of the magnet switch 3 is connected and an armature (not shown) is energized and generates the rotation force. The magnet switch 3 drives a plunger (not shown) embedded in the magnet switch 3 to connect and disconnect the inner contact. Further, the magnet switch 3 pushes the one-way clutch 8 forward (left side in FIG. 1) by using a pull-in force for driving the plunger.

The output shaft 4 is disposed in a coaxially aligned manner with a rotary shaft (armature shaft) of the motor 2. The rotation of the armature is transmitted to the output shaft 4 through a non-illustrated speed reduction gear device (e.g. a planetary speed reduction gear device). The output shaft 4 has helical splines 4a.

The pinion 6 is joined at the front end of the tube 7 through splines to be rotatable with the tube 7. Also, the pinion 6 is restricted from moving in an axial direction with respect to the tube 7.

Figure 3:
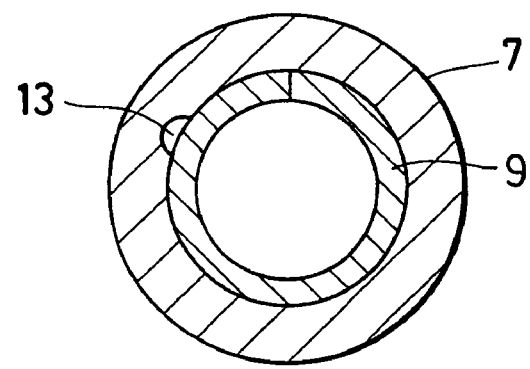
FIG. 3 is a cross-sectional view of the tube according to the embodiment of the present invention.

The tube 7 has a cylindrical shape and its front end supporting the pinion 6 is closed into a cap-shape. A bearing 9 is press-fitted in the inner cylindrical surface of the cylindrical tube 7. The tube 7 is rotatably and slidablly engaged with an outer peripheral surface of the output shaft 4 through the bearing 9. A bearing 10 is provided on the outer circumference of the tube 7 in a front case 11 so that the tube 7 is rotatably and slidablly supported in a front case 11 through the bearing 10. As shown in FIG. 3, the bearing 9 is a wrapping bearing that is formed by rounding a rectangular-shaped plate into a cylindrical shape.

A ventilation groove 13 is formed on the inner cylindrical surface of the tube 7. An enclosed space (closed space) 12 is defined around a front end of the output shaft 4 inside the closed end of the tube 7. The closed space 12 communicates with a space rearward of the bearing 9 (a space defined in an inner periphery of the one-way clutch 8) through the ventilation groove 13.

Figure 2:
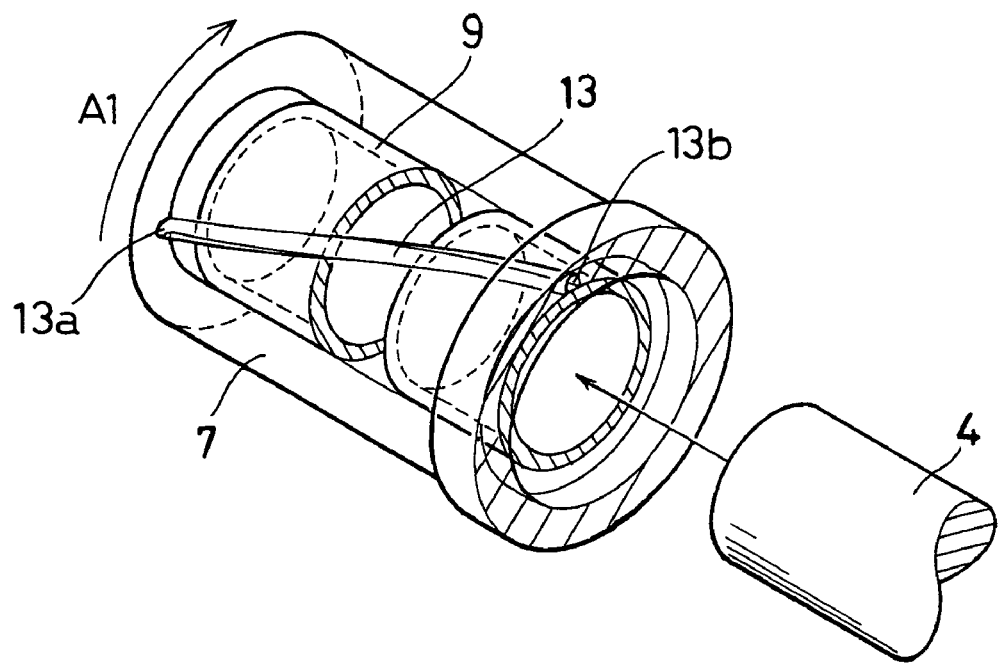
FIG. 2 is a perspective view of a tube illustrating a ventilation groove according to the embodiment of the present invention.

As shown in FIG. 2, the ventilation groove 13 is formed as a helical path twisted about an axis of the tube 7 from the motor 2 side toward the pinion 6 side. Specifically, the ventilation groove 13 is twisted in a direction opposite to a rotation direction (arrow A1 in FIG. 2) of the tube 7 from the motor 2 side toward the pinion 6 side. The direction A1 is the rotation direction of the tube 7 when the tube 7 moves forward on the output shaft 4.

In a developed view of the tube 7 shown in FIG. 3, the ventilation groove 13 is inclined with respect to the axial direction of the tube 7 such that a front end 13a (on the pinion 6 side) and a rear end 13b (on the motor 2 side) do not overlap or coincide with each other in a circumferential direction. Further, the ventilation groove 13 is formed to extend within a half of a cylindrical surface area of the tube 7, that is, in a cylindrical area of less than 180 degrees. When the tube 7 is viewed in the axial direction of the tube 7, the front and rear ends 13a and 13b are situated at different positions in the circumferential direction.

The one-way clutch 8 has a barrel 8a, a clutch outer 8b, a clutch inner 8c, a roller 8d and the like. The barrel 8a engages with the helical splines 4a of the output shaft 4. The clutch outer 8b is integrated with the barrel 8a. The clutch inner 8c extends from the rear end of the tube 7. The roller 8d is interposed between the clutch outer 8b and the clutch inner 8c. The one-way clutch 8 transmits the rotation of the output shaft 4 to the tube 7. Also, the one-way clutch 8 interrupts a motive power transmission between the inner 8c and the outer 8b to restrict the armature from overrunning, when a rotation of the tube 7 becomes faster than that of the output shaft 4.

Next, operation of the starter 1 is described.

When the ignition key switch is turned on by a user, the pull-in force generated in the magnet switch 3 is transmitted to the one-way clutch 8 through the lever 14. As a result, the one-way clutch 8 is pushed forward (left side in FIG. 1) with the tube 7 on the output shaft 4 while rotated along the helical splines 4a of the output shaft 4. The pinion 6 supported on the tube 7 is moved forward and brought into contact with the ring gear 5.

When the inner contact of the magnet switch 3 is connected and the armature is energized, the rotation force is generated in the armature. The rotation of the armature is decelerated by the speed reduction gear device and transmitted to the output shaft 4. Further, the rotation is transmitted to the tube 7 from the output shaft 4 through the one-way clutch 8. The pinion 6 is pushed to a position capable of meshing with the ring gear 5 while being rotated, so the pinion 6 is meshed with the ring gear 5. In this way, the rotation force is transmitted to the ring gear 5, thereby starting the engine.

In the above operation, when the tube 7 is pushed forward on the output shaft 4, a volume of the closed space 12, which is defined around the front end of the output shaft 4 in the closed end of the cylindrical tube 7, is increased. On the other hand, when the tube 7 is pulled back on the output shaft 4 after the engine starting, the volume of the closed space 12 is decreased. At this time, since the ventilation groove 13 is formed on the inner cylindrical surface of the tube 7, even when the volume of the closed space 12 is changed, a pressure change in accordance with the volume change can be cancelled. Therefore, the tube 7 is moved smoothly.

In the starter 1, the groove 13 formed on the inner wall of the tube 7 has a helical shape. When the bearing 9 is press-fitted in the inner periphery of the tube 7, a direction of press-fitting the tube 7 and a direction along the ventilation groove 13 do not coincide with each other, but cross each other. Therefore, it is prevented that an identical position of the bearing 9 is moved along the ventilation groove 13 when the bearing 9 is press-fitted in the tube 7. Accordingly, it is decreased that the bearing 9 partially protrudes into the ventilation groove 13, thereby suppressing deformation of the bearing 9.

Further, it is prevented that the bearing 9 is deformed or projected into the ventilation groove 13 at circumferentially same portions through the rear end to the front end of the bearing 9. Therefore, it becomes easy to properly draw the inner peripheral surface of the bearing 9. Therefore, a precision of the inner diameter of the bearing 9 can be improved, so the bearing 9 can have a predetermined bearing performance. Further, the starter 1 can maintain its performance.

Since the bearing 9 is not easily projected into the ventilation groove 13, a space of the ventilation groove 13 is not decreased. Therefore, a function of the ventilation groove 13 can be maintained. Further, the ventilation groove 13 is twisted in the direction opposite to the rotation direction A1 of the tube 7 from the motor 2 side toward the pinion 6 side. Therefore, when the tube 7 moves forward on the output shaft 4 while rotating, a flow of air in the ventilation groove 13 becomes smooth. Therefore, the function of the ventilation groove 13 is improved.

In addition, as described above, since the ventilation groove 13 has the helical shape to suppress the deformation of the bearing 9, it is possible to use a wrapping bearing, which is generally inexpensive, as the bearing 9. Further, since the deformation of the bearing 9 is suppressed, it is possible to increase a width of the ventilation groove 13 as compared with a ventilation groove formed into a straight line in the axial direction. In other words, it is possible to increase the width of the ventilation groove 13 within a range that the deformation of the bearing 9 is suppressed. With this, the flow of the air in the ventilation groove 13 becomes further smooth.

Figure 4:
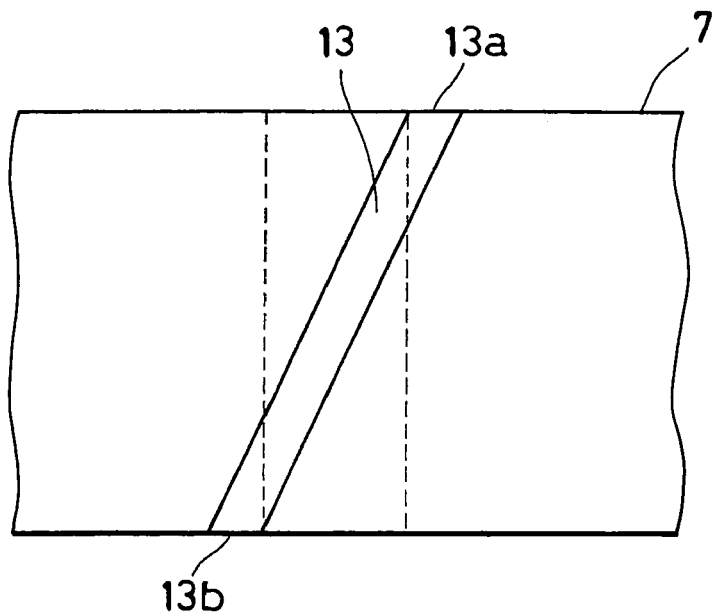
FIG. 4 is a developed view of the tube according to the embodiment of the present invention.

With the increase in the width of the ventilation groove 13, even if shavings, which are generated while the ventilation groove 13 is cut or shaved, enter the ventilation groove 13, the shavings can be easily removed. In this case, it is preferable that the front end 13a and the rear end 13b of the ventilation groove 13 are arranged without overlapping in the circumferential direction, as shown in FIG. 4.

That is, it is preferable that the front end 13a and the rear end 13b are situated at the different positions in the circumferential direction.

Figure 5:
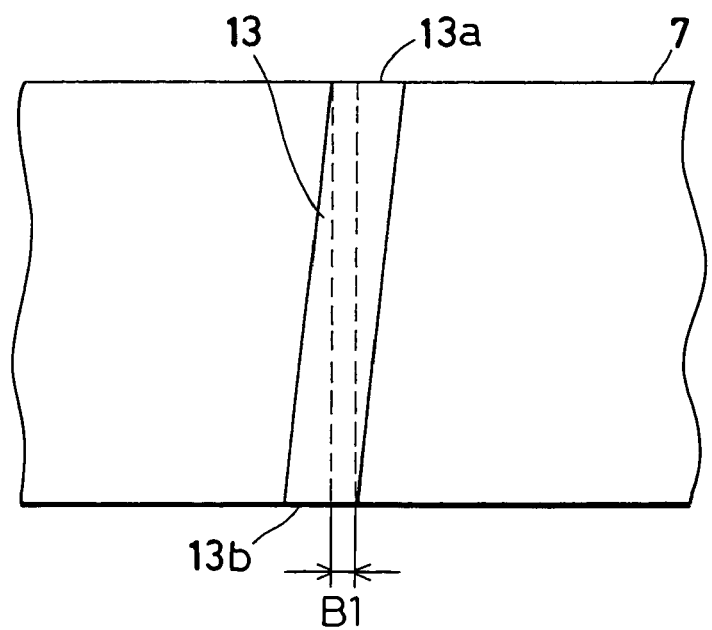
FIG. 5 is a developed view of a tube illustrating an example of a ventilation groove.

In a case that the width of the ventilation groove 13 is increased, if the front end 13a is overlapped with the rear end 13b in the circumferential direction, as shown in FIG. 5 (for example, area B1), the ventilation groove 13 partially exists on a straight line in the axial direction. This is not desirable to decrease the deformation of the bearing 9.

If the ventilation groove 13 is twisted greater than or equal to 180 degrees in the circumferential direction when viewed in the axial direction, that is, the groove 13 is formed to extend over the half of the cylindrical surface area of the tube 7, air resistance is increased. Therefore, it is preferable that the ventilation groove 13 is twisted in the cylindrical area of less than 180 degrees to improve the flow of the air. Further, it is not always necessary that the ventilation groove 13 is single, but more than two ventilation grooves 13 can be formed.

In addition, it is desirable that a twisted angle of the ventilation groove 13 with respect to the axis of the tube 7 is substantially the same as a twisted angle (of 10 to 30 degrees) of the helical splines 4a. When the tube 7 is pushed forward on the output shaft 4, the tube 7 is rotated along the helical splines 4a of the output shaft 4. In the case that the ventilation groove 13 is twisted at the angle of substantially the same as that of the helical splines 4a, the air can flow in the ventilation groove 13 further smoothly.

In the above-described embodiment, the ventilation groove 13 has the helical shape that is twisted about the axis of the tube 7 in the direction opposite to the rotation direction A1 of the tube 7 from the motor 2 toward the pinion 6. However, the ventilation groove 13 can be twisted in the rotation direction of the tube 7 (direction of the arrow A1 in FIG. 1). Also in this case, it is prevented that the identical portion of the bearing 9 is moved along the ventilation groove 13 when the bearing 9 is press-fitted in the tube 7. Therefore, it is decreased that the bearing 9 is partially projected into the ventilation groove 13, thereby suppressing the deformation of the bearing 9.

The present invention should not be limited to the disclosed embodiments, but may be implemented in other ways without departing from the spirit of the invention.

What is claimed is:

1. A starter for starting an engine by transmitting a rotation force of a motor to a ring gear through a pinion, the starter comprising:
    an output shaft rotated with an operation of the motor;
    a cylindrical tube engaging with an outer peripheral surface of the output shaft to be slidable in an axial direction through a bearing fitted in the tube, the cylindrical tube having a first and second ends, the first end supporting the pinion and being closed to define an enclosed space between the first end and an end of the output shaft; and
    a one-way clutch for transmitting a rotation of the output shaft to the tube, wherein:
    the tube has a ventilation groove on an inner cylindrical surface to communicate the enclosed space with a space defined in a proximity of the second end of the tube, the ventilation groove being formed into a helical shape twisted about an axis of the tube,
    the ventilation groove is twisted in a direction opposite to a rotation direction of the tube from the second end toward the first end of the tube,
    the bearing is press-fitted to the inner cylindrical surface of the tube,
    the ventilation groove is formed on the inner cylindrical surface of the tube and is located on a radially outside of the bearing,
    the ventilation groove defines a groove first end that is open on the inner cylindrical surface axially between the first end of the tube and an end of the bearing and a groove second end that is open on the inner cylindrical surface axially between the second end of the tube and an opposite end of the bearing,
    the ventilation groove has a first end and second end, and the first and second ends are situated at circumferentially different positions in a cylindrical surface area of less than 180 degrees,
    the first and second ends of the groove are situated without overlapping in the circumferential direction, and
    the bearing is a wrapping bearing formed by rounding substantially a rectangular-shaped plate into a cylindrical shape.

2. The starter according to claim 1, wherein the output shaft has helical splines on the outer peripheral surface and the ventilation groove is twisted at an angle of substantially a same as a twisted angle of the helical splines.

3. The starter according to claim 1, wherein the ventilation groove is formed to extend within a half of a cylindrical surface area of the tube.

4. The starter according to claim 3, wherein the ventilation groove has a first end and second end, and the first and second ends are situated without overlapping in a circumferential direction when viewed in an axial direction of the tube.

5. The starter according to claim 1, wherein
    the bearing is press-fitted to the inner cylindrical surface of the tube straight along the axis of the tube from the second end of the tube toward the first end of the tube.

6. The starter according to claim 1, wherein
    the bearing is press-fitted to the inner cylindrical surface of the tube straight along the axis of the tube from the second end of the tube toward the first end of the tube.

7. The starter according to claim 1, wherein
    the bearing is a first bearing and is one of a plurality of bearings,
    the first bearing is press-fitted to an inner bore of the tube, which is defined by an inner cylindrical surface of the tube, straight along the axis of the tube from the second end of the tube toward the first end of the tube,
    a second bearing is press-fitted to the inner bore of the tube straight along the axis of the tube from the second end of the tube,
    the first bearing is located closer to the first end of the tube than the second bearing,
    the ventilation groove is formed on the inner cylindrical surface of the tube and located radially outside of the first and second bearings, and
    the ventilation groove opens to the inner bore of the tube at a first location that is axially between the first end of the tube and the first bearing, a second location that is axially between the second bearing and the second end of the tube, and a third location that is axially between the first bearing and the second bearing.

* * * * *